Sept. 1, 1970   HIROSHI WATANABE   3,526,071
PANEL FOR CURTAIN WALLS AND METHOD OF JOINTING
CORNERS OF THE SAME
Original Filed May 11, 1967   2 Sheets-Sheet 1
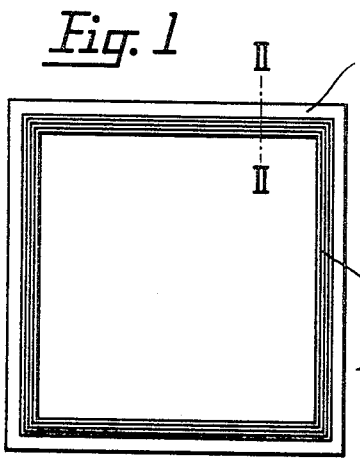
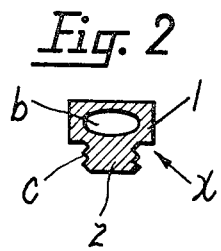
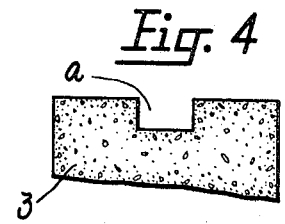
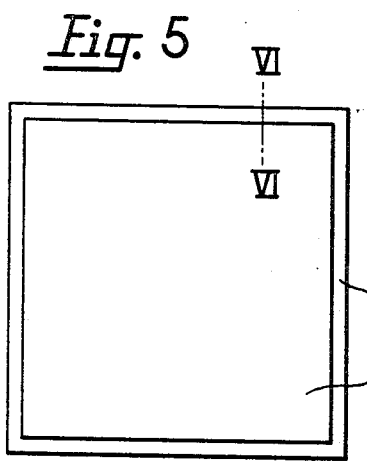
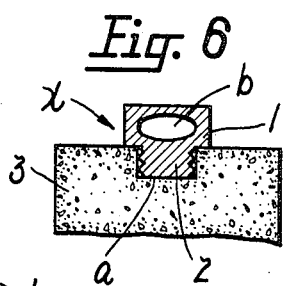
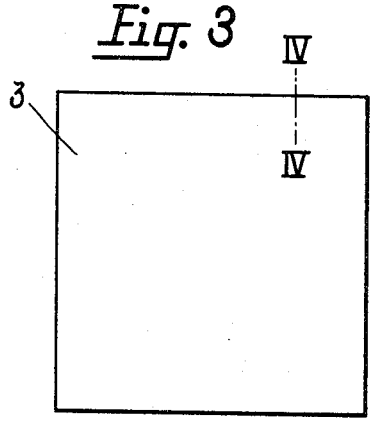
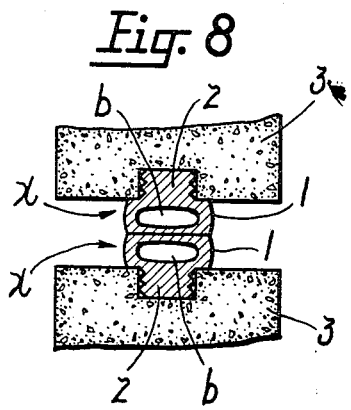
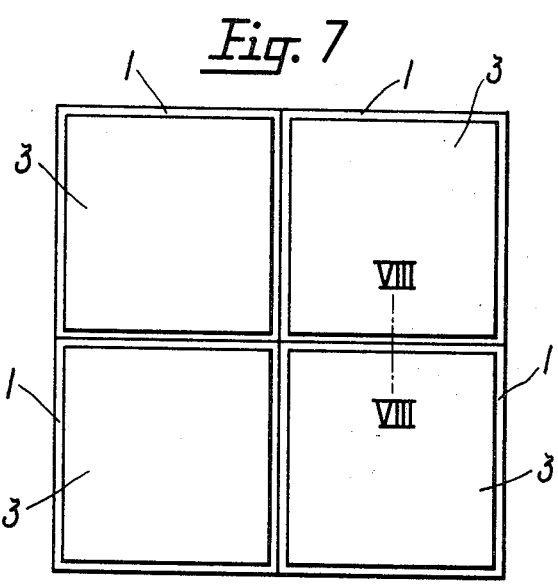
INVENTOR
Hiroshi Watanabe
BY Watson, Cole, Grindle + Watson
ATTORNEYS

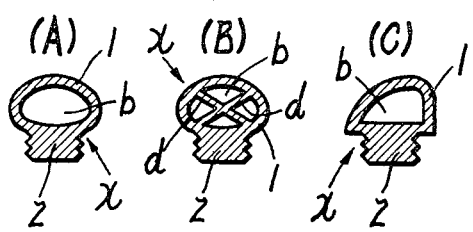
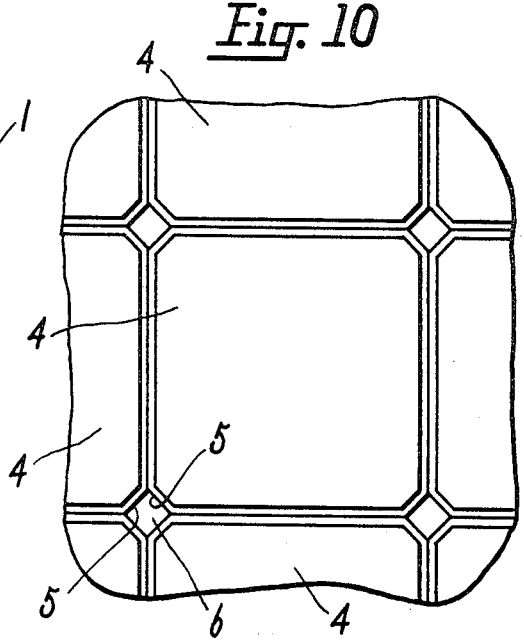
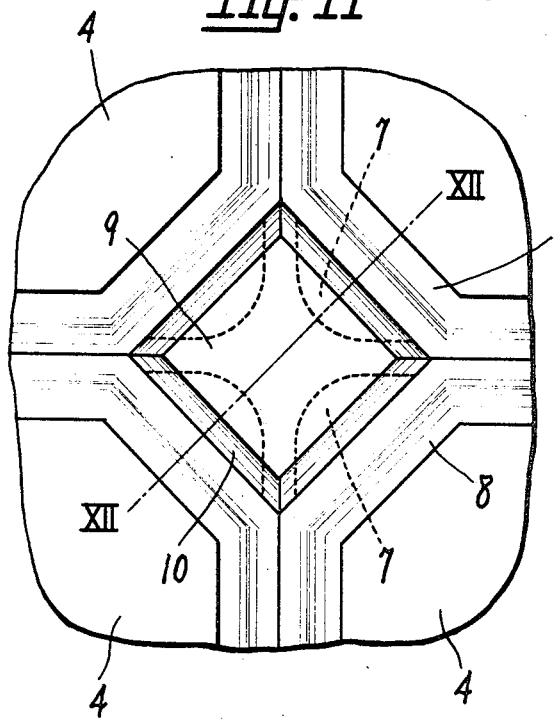
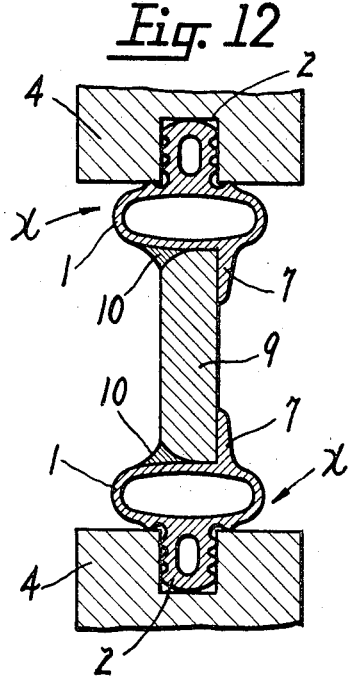

United States Patent Office 3,526,071
Patented Sept. 1, 1970

3,526,071
PANEL FOR CURTAIN WALLS AND METHOD OF JOINTING CORNERS OF THE SAME
Hiroshi Watanabe, Ikeda, Japan, assignor to Kogyo Gomu Company Limited, Osaka Prefecture, Japan
Continuation of application Ser. No. 637,668, May 11, 1967. This application Feb. 17, 1969, Ser. No. 802,749
Int. Cl. E04b *1/36*
U.S. Cl. 52—403                              2 Claims

ABSTRACT OF THE DISCLOSURE

A plate-shaped panel for curtain walls surrounded on periphery with a gasket so that, when the panel is set, said gasket may form a favorable joint and eliminate the need of extensive jointing work. At the corner of four panels, each gasket is provided with a projection which support a piece of rubber closing any air gap.

---

This application is a continuation of application Ser. No. 637,668, filed May 11, 1967, now abandoned.

This invention relates to panels for curtain walls and methods of jointing corners of the same.

With the advent of high-storied buildings, particularly those employing the curtain wall system, there is an increased tendency of standardizing as much as possible what has been normally done in the field so that now, many of the curtain walls may be produced in the factory thereby simplifying the work and time required for the job at the building site.

A like tendency occurs also regarding panels to be fitted to outside building walls. The work of making water-tight clearances between panels has been heretofore carried out after the panels are fitted to a building. However, many attempts have been made to simplify or eliminate this type of work.

Furthermore, in a building constructed by the curtain wall process, a relative displacement between panels may result by external forces such as, wind pressure or earthquake tremors For higher buildings, the tendency is greater and the absolute value of the relative displacement is larger. Under such conditions, conventionally used sealing material cannot accommodate such displacement so that it is difficult to keep the joints perfectly water-tight and air-tight.

An object of the present invention, therefore, is to provide a panel which can be kept water-tight merely by being fitted to the outside surface of a building, and which requires no joint work and which can reduce the working time. And, even in cases where the absolute value of the relative displacement is large, the displacement will be absorbed by a slip between gaskets so that the panel may easily return to the original state and the original sealability may be recovered.

A further object of the present invention is to provide a method of jointing water-tight and air-tight corners in such a panel as mentioned above.

In the accompanying drawings,

FIG. 1 is an elevation view illustrating an embodiment of a gasket to be used for a panel according to the present invention.

FIG. 2 is a cross-sectional view taken on line II—II of FIG. 1.

FIG. 3 is an elevation view illustrating an embodiment of a panel body according to the present invention.

FIG. 4 is a cross-sectional view taken on line IV—IV in FIG. 3.

FIG. 5 is an elevation view illustrating an embodiment of a panel according to the present invention.

FIG. 6 is a cross-sectional view taken on line VI—VI in FIG. 5.

FIG. 7 is an elevation view illustrating the panels shown in FIG. 5 as assembled.

FIG. 8 is a cross-sectional view taken on line VIII—VIII in FIG. 7.

FIGS. 9A, B and C are cross-sectional views illustrating other embodiments of gaskets to be used for panels of the present invention.

FIG. 10 is an elevation view illustrating another embodiment of panels as assembled.

FIG. 11 is a magnified elevation view of jointed corners in the embodiment shown in FIG. 10.

FIG. 12 is a cross-sectional view taken on line XII—XII in FIG. 11.

According to the present invention, an annular groove *a* is provided along the lengthwise direction of the edge of a plate-shaped panel 3 and a gasket *x* of an annular cross-section consisting of a protrusion 2 insertable in the groove *a* and a compressible part 1 to be positioned outside the groove *a*, is fitted on the peripheral edge of said plate-shaped panel 3.

FIG. 1 is an elevation view illustrating an embodiment of the annular gasket *x*. If the plate-shaped panel 3, in which the gasket is inserted, is square, the gasket will be formed in the form of a picture frame, said gasket *x* being made of elastic material such as rubber or plastics.

The plate-shaped panel 3 is made of concrete, stone, metal or synthetic resin. Such groove as is shown by *a* in FIG. 4 is provided annularly along the lengthwise direction on the peripheral edge of said panel 3.

The cross section of the annular gasket *x* consists of the part 2 to fit in the groove *a* of the plate-shaped panel 3, as shown in FIG. 2, and the part 1 is to be positioned outside the groove *a* when the protrusion 2 is fitted in the groove *a*, as shown in FIG. 6. The part 1 is provided with a void *b* or a spongy substance easy to compress and deform so that the part 1 may be compressible.

It is desirable to provide corrugations *c* on both sides of the protrusion 2 so that the gasket may easily fit the inside walls of the groove despite the irregularity of the groove dimensions, and so that the water-tightness between the protrusion 2 and the groove part may be adequate, and so that the part 1 may not readily fall away from the groove.

As shown in FIGS. 5 and 6, the annular gasket *x* is fitted to the outer peripheral edge of the plate-shaped panel 3 by fitting the protrusion 2 in the groove *a* of the plate-shaped panel 3.

When the panels according to the present invention are fitted in contact with the outside wall of a building as illustrated in FIG. 7, the parts 1 of the annular gaskets *x* will be well pressed into contact with each other on the peripheral edge and, as said parts 1 are compressibly formed, even if there is an error in the dimensions and fitting positions of the panels, such error will be easily absorbed by the parts 1 and thus the water-tightness will be kept without any clearance resulting between the panels.

In the shape of the cross section of the annular gasket *x*, the part 1 may not only be square in cross section, as shown in FIG. 2 but may also be in the form of a pipe as shown in FIG. 9 or in the form of a triangular-sectioned pipe as shown in FIG. 9A, B. Also, the void *b* in the part 1 may be filled with sponge. In either case, as the flexure of the void is necessary to produce the pressing contact force of the void *b*, required for the water-tightness is related with the force required to bring the adjacent panels near the regulated clearance, so that the proper shape can be selected by taking the pressing contact force, the amount of flexure of the void *b*, and the above mentioned dimension errors into consideration.

An advantage of the panel, according to the present invention, is that, as the annular gasket x is fitted to the outer periphery, the edge of the panel can be prevented from being broken during the transportation from the factory to the building field.

In conventional practice, as soon as the panels arrive at the building site, the panels for the outer wall are assembled and hung and a calking material or gasket is inserted into each clearance between the panels. This work requires much labor and time.

On the other hand, according to the present invention, if the respective panels are arranged and fitted, one, by one vertically and horizontally, so that the annular gaskets may be compressed, the work will be easily and finally completed within a short time and water-tightness will be insured, as shown in FIG. 8. Needless to say, even if the wall body is shaken, as by an earthquake, the gasket will act as a damper to prevent the damage of the wall body, that, such separation, dropping and cracking, of the calking material, as in conventional practice, will not occur. The relative displacement will be absorbed by the slip between the gaskets in contact with each other and the water-tightness will be restored easily and accurately.

The present invention also includes a method of maintaining water-tightness and air-tightness by the relative displacement of the joints in the corners of the panels.

When assembling plate-shaped panels 4 as shown in FIG. 10, the peripheral edges of each plate-shaped panel 4 will be pressed into contact with one another with the annular gaskets x of each panel touching. However, the peripheral edges of any four panels will not always be aligned so that the contact lines of the gaskets in contact with each other, will not form a perfect cross in the corners formed by the four panels, and an air gap will be left in some cases. In order to avoid such an air gap, the gaskets are formed so that corners 5 may be formed and resulting in a square air gap 6. Therefore, in order to maintain water-tightness and air-tightness at such air gap 6, a projection 7 is provided on one side of the part 1 at the corner 8 of the annular gasket x, so that four of such projections 7 may project into the square air gap 6 formed at the corners 5. A soft material part 9, such as a rubber piece of the same shape is inserted into the air gap 6. The periphery of the above mentioned soft material part 9 is filled with the parts 1 of the annular gaskets x and an elastic sealing material 10. By thus sealing the air gap at the four irregular corners, the air-tightness and water-tightness can be secured.

Thus, according to the present invention, the property of following the relative displacement of the panels by the displacement of the curtain wall with respect to the wall of the building is high and the fitting work is very simple.

What is claimed is:
1. A panel assembly for curtain wall comprising:
four panels in mutual contact with one another and each having an annular groove formed along its peripheral end walls, each groove having flat side walls and a bottom wall, each of said panels being rectangular in shape with each corner thereof removed whereby a rectangular gap is formed at the intersection thereof;
a resilient, hollow tubular gasket fitted around the periphery of each said panel, each said gasket being formed of a compressible part and a protruding portion along its entire length, said protruding portion having a cross section substantially the same as said groove of each said panel and having corrugations along opposite sides thereof so that when said gasket is fitted to each of said panels, said protruding portion, only, will occupy said groove of each said panel with said corrugations in contact with the side walls of said panel groove, and said compressible part of each said gasket, being of a width greater than the distance between said groove side walls of each said panel, solely offers a contact surface between said mutually contacting panels;
an insert plate provided within said gap in contact with each of said gaskets; and
projections provided on each of said gaskets within said gap for maintaining said plate therewithin.
2. The panel assembly according to claim 1 wherein said projections are positioned on one side of said plate and sealing material is provided around the periphery of said plate along the other side thereof.

References Cited
UNITED STATES PATENTS

| | | |
|---|---|---|
| 2,135,118 | 11/1938 | Stewart. |
| 2,156,681 | 5/1939 | Dewhirst et al. |
| 2,717,514 | 9/1955 | Meek. |
| 2,808,624 | 10/1957 | Sullivan. |
| 2,891,492 | 6/1959 | Gerosa. |
| 3,011,222 | 12/1961 | Spiselman. |
| 3,178,026 | 4/1965 | Christy. |
| 3,312,026 | 4/1967 | Rolland. |
| 3,315,426 | 4/1967 | Rolland _____ 52—396 X |
| 3,319,392 | 5/1967 | Fitzgerald. |
| 3,403,488 | 10/1968 | Davidson et al. ____ 52—403 X |

FOREIGN PATENTS

| | | |
|---|---|---|
| 1,395,872 | 3/1965 | France. |

ALFRED C. PERHAM, Primary Examiner

U.S. Cl. X.R.

52—235, 396